(No Model.)　　　　J. F. COTTER & J. TAGER.　　2 Sheets—Sheet 1.
COCK OR FAUCET.
No. 601,634.　　　　　　　　　　　　　Patented Apr. 5, 1898.
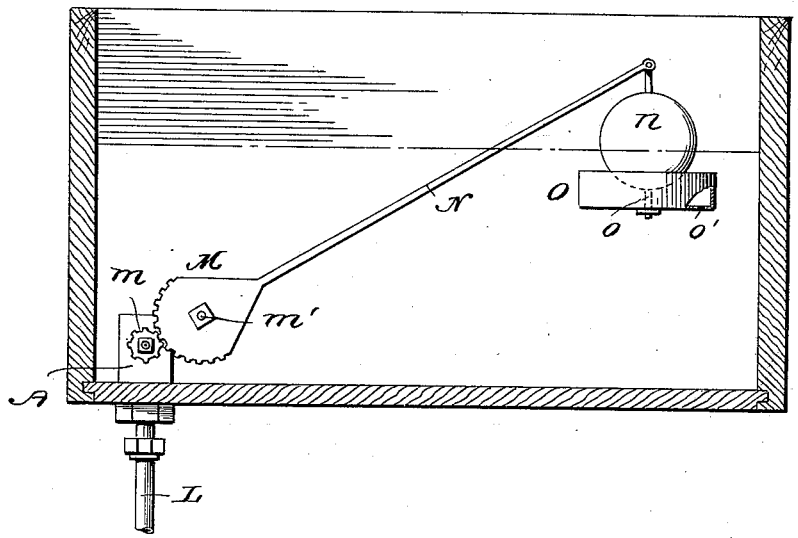
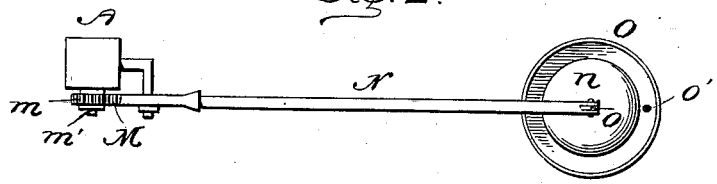
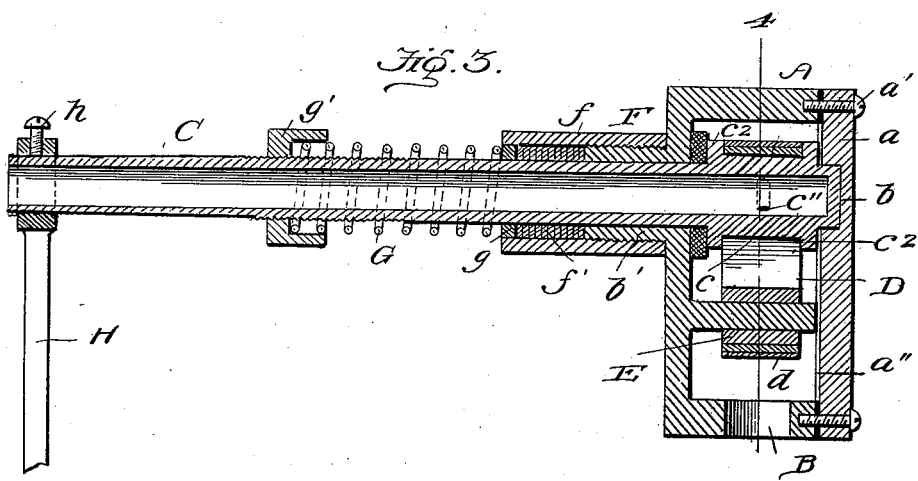
Witnesses:　　　　　　　　　　　Inventors:
　　　　　　　　　　　　　　　　John F. Cotter
　　　　　　　　　　　　　　　　Joseph Tager.
　　　　　　　　　　　　　　By Edson Bro's
　　　　　　　　　　　　　　　　Attys.

(No Model.) 2 Sheets—Sheet 2.
J. F. COTTER & J. TAGER.
COCK OR FAUCET.
No. 601,634. Patented Apr. 5, 1898.
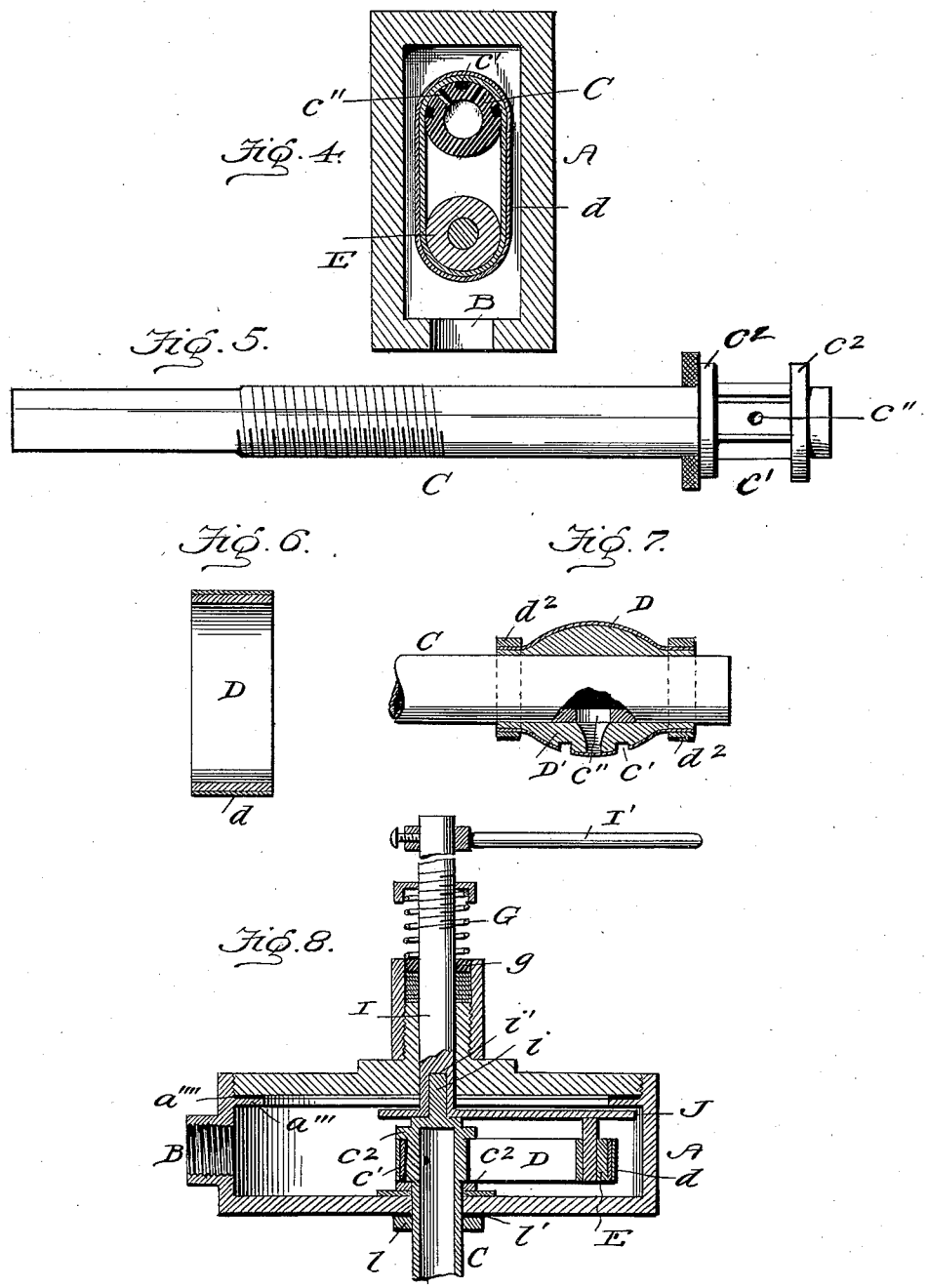
Witnesses:
Inventors:
John F. Cotter
Joseph Tager

UNITED STATES PATENT OFFICE.

JOHN F. COTTER AND JOSEPH TAGER, OF KANSAS CITY, MISSOURI.

COCK OR FAUCET.

SPECIFICATION forming part of Letters Patent No. 601,634, dated April 5, 1898.

Application filed December 9, 1896. Serial No. 615,025. (No model.)

*To all whom it may concern:*

Be it known that we, JOHN F. COTTER and JOSEPH TAGER, citizens of the United States, residing at Kansas City, in the county of Jackson and State of Missouri, have invented certain new and useful Improvements in Cocks or Faucets; and we do hereby declare the following to be a full, clear, and exact description of the invention, such as will enable others skilled in the art to which it appertains to make and use the same.

Our invention relates to improvements in cocks or faucets for liquid-pipes capable of use in a variety of different ways, such as a cock for an air-ball or float in flushing-tanks of water-closets or in other kinds of tanks where floats are used to close valves and regulate the quantity of water allowed to flow into the tank, as a bath-tub cock, a wash-tray cock, a basin or sink cock, or in other place where it is desired to regulate the flow of a liquid through a pipe or main.

One objection to the ordinary styles of water-inlet valves in closet-tanks is that the water makes a loud rushing noise when flowing into the tank; but this humming or thumping noise is entirely overcome by our invention, which has been found to be practically noiseless in operation.

Another object that we have in view is to provide an improved type of ball-cock in which the float or air-ball acts more sensitively and responds quickly to the outflow of water from the tank. Ordinarily the float or air-ball is loaded or weighted on the inside of the lower part thereof to make it respond to the descent of the water.

We attain the object of our invention by omitting the weight in the float and by providing a float of light material and a flanged cup or receptacle which is attached externally to the float to move with the same in its rising and falling movements, said cup serving as a drag to the float and having in its bottom a port or opening through which water may flow slowly when the float ascends and to insure under all conditions a quick response of the float and valve to any changes in the water-level. When the plumbing is cut off and the water allowed to escape from the tank, the port in the cup insures the drainage of water therefrom to obviate freezing of the parts.

A further object of our invention is to provide a novel self-tightening packing which will keep water-tight joints between the cock and the supply-pipe, and, finally, the object is to provide a simple and durable construction which will be efficient and reliable in service.

To the accomplishment of these objects our invention consists in the novel combination of devices and in the construction and arrangement of parts which will be hereinafter fully described.

To enable others to understand our invention, we have illustrated the same, together with modifications of the valve, in the accompanying drawings, forming a part of this specification, and in which—

Figure 1 is a view, partly in section and partly in elevation, illustrating our cock used in connection with the improved float or air-ball and a tank. Fig. 2 is a plan view of the devices shown by Fig. 1 with a part of the tank omitted. Fig. 3 is a vertical central sectional view through the cock, on an enlarged scale, illustrating the same provided with a handle for manual operation and to adapt the same for service as a bath or other style of cock. Fig. 4 is a horizontal sectional view on the plane indicated by the dotted line 4 4 of Fig. 3. Fig. 5 is a detail view of the outlet pipe or stem. Fig. 6 represents a cross-section of the endless traveling band or ring adapted to close the egress-ports in the outlet pipe or stem. Fig. 7 represents a modification of the traveling band. Fig. 8 is a vertical sectional elevation of a modified construction of the cock, showing the same in a round casing and with a stationary outlet stem or pipe combined with a traveling endless band and means for actuating the same.

Like letters of reference denote corresponding parts in all the figures of the drawings, referring to which—

A indicates the shell or casing. B is the water-inlet thereto. C is the outlet stem or pipe. D is an endless band or ring packing arranged to open or close the ports to said outlet pipe or stem, and E is a loose guide for the endless band or ring packing, the detail construction and arrangement of which elements in the preferred embodiment of our invention illustrated in the drawings we will now proceed to describe.

The case A may be rectangular in shape, with rounded or angular corners, or it may be cylindrical, as shown by the drawings, or it may be of any other appropriate shape. The case has a cap-plate or top $a$, which is made to be removable readily for the purpose of having easy access to the interior of the case. As shown by Fig. 3, the cap-plate is fastened in place by screws $a'$, and a packing or gasket $a''$ is clamped between the edges of the case and the cap-plate to provide a water-tight joint; but when the round case or shell is employed, as in Fig. 8, the shell has an internal shoulder $a'''$ and a screw-threaded open end, into which threaded end is screwed the threaded edge of the cap, which serves to clamp the packing or gasket $a''''$ between itself and the shoulder $a'''$ and thus secure the proper tight joint.

In the construction shown by Fig. 3 the removable cap or top $a$ is formed with a recess $b$, which constitutes a step-bearing for the inner extremity of the outlet pipe or stem C, and the case itself is formed with an opening or nipple $b'$ in axial alinement with the step-bearing $b$, which opening or nipple is adapted to receive the gland $f$ of a stuffing-box F, through which passes the outlet stem or pipe C. The gland $f$ is of larger diameter internally than the pipe or stem C, and in the gland is placed the packing $f'$, which surrounds the pipe C. On this packing bears the metallic or other washer $g$, which is pressed down firmly against the packing by a coiled pressure-spring G, fitted loosely around the stem C and held under tension by a nut $g'$. As shown by Fig. 3, this nut $g'$ is screwed on a threaded part of the spindle; but we do not strictly limit ourselves to this particular manner of holding the nut and spring in place.

The outlet-stem C is hollow entirely or nearly throughout its length, and near its inner end the stem is enlarged or thickened somewhat to provide a proper bearing for the endless or traveling band, and its inner or upper end is fitted snugly in the recess or step-bearing $b$, whereby the outlet-stem C is journaled in the step-bearing and the stuffing-box in a manner to turn axially therein and at the same time secure a tight joint where it emerges from the shell. The part $c$ of the stem is provided on one side or half its external surface with a series of grooves or channels $c'$, which are parallel to the axis of the stem, the remaining side of the part $c$ being ungrooved to present a smooth cylindrical surface. The edges of the grooves $c'$ enable the endless band to obtain good frictional contact with the outlet-stem C. Through the grooved side of the stem is formed the egress port or ports $c'$, the axes of which are at an angle to the longitudinal axis of the stem C, so that the ports open laterally through the stem. The stem is further provided with means for guiding or keeping in place the traveling band or ring packing D, which means consists of the enlarged shoulders $c^2 c^2$, which are spaced along the stem to lie on opposite sides of the part $c$ of said stem.

The band or ring packing D may consist of an endless piece of rubber, webbing, textile fabric, or other appropriate material, and it is of a width proper to fit on the part $c$ of the stem and between the shoulders $c^2 c^2$ thereof. This band or ring is of a length suitable to extend to and around a guide E, situated within the casing at one side of the outlet-spout C. This guide consists, preferably, of an antifriction-roller mounted loosely on a spindle or pin fixedly attached to the bottom of the casing, whereby the interior mechanism of the valve is wholly independent of the cap-plate $a$ to permit the ready removal of the latter for access to the interior of the valve.

The band or packing-ring D in one embodiment of our invention is reinforced by a broad metallic band $d$, which is practically equal in width to the fabric or rubber band and which serves to prevent the band from stretching when it is strained lengthwise by and between the outlet-stem C and the roller-guide E to secure the necessary close joint between said band or ring packing and the perforated stem C, and said band or packing and its reinforcement is confined and guided between the spaced shoulders $c^2$ on the rotary stem C.

In another embodiment of our invention the reinforcement is in the form of narrow bands $d^2$, applied to the edges of the rubber or fabric D, and the shoulders $c^2$ on the stem are omitted and their place supplied by a centrally enlarged or thickened sleeve D', which is fitted on the stem to rotate therewith, said sleeve presenting a centrally-bulged part which keeps the fabric or rubber band against edgewise displacement, and said sleeve being made of hard rubber or other appropriate material and provided with grooves and a port or ports for the passage of water to the axial passage in the outlet-stem C.

The valve has its outlet-stem C provided with a suitable handle H, which is fixed by a set-screw $h$ to the stem at a point near its open discharge end. The handle is applied to the styles of valves which may be used for manual adjustment, such as bath-cocks or sink and basin cocks.

The guide-roller and one part of the endless web or ring packing lies close to and opposite the water-inlet B in the casing or shell of the valve. The improved valve is designed for the purpose of breaking the pressure in the tank and to operate practically noiselessly.

When the outlet-stem is turned to a position where the ports $c'$ are covered by the web or ring packing, the water is shut off from the stem C and cannot pass through the valve. By turning the stem C part way around the ring is moved and the ports $c'$ are exposed within the packing or ring, so that water can circulate around the parts and flow through the ports $c'$ and the hollow stem, thus opening the valve to the free passage of water, but without creating the objectionable noise common to ordinary nozzles.

In the modified construction shown by Fig. 8 of the drawings the stem remains fixed or stationary within the shell, while the band or ring packing is arranged to sweep around the stem under the action of an operating-spindle I. The outlet-stem is closed at its inner end and provided with a central projecting pintle $i$, which fits in a socket $i'$ in the inner end of the operating-spindle I, which lies in axial alinement with the stem. The stem has the lateral egress-ports around which and the roller E the band or ring packing is stretched tightly, and the stem is fixed by a check-nut $l$, screwed on a threaded part of the stem and up against the valve-casing, a suitable gasket $l'$ being provided for making a tight joint between the casing and fixed outlet-stem. The spindle I passes through the stuffing-box provided on the top or cap of the valve-casing and constructed substantially the same as the stuffing-box shown by Fig. 3, and said stem has its outer end provided with a handle I′, while to the inner end thereof is attached a carrier-plate J, on which is mounted the antifriction-roller for the support of the band or ring packing. When the spindle I is turned to cause the carrier-plate and the ring-packing or band to sweep part way around in the casing, the ports $c'$ in the stem are exposed and water can flow through the casing and the stem; but when the spindle is operated to move the carrier-plate and band to a position where the band lies over and closes the ports $c'$ in the stem the valve is closed against the passage of water through the shell and stem.

In applying our valve to water-tanks generally it is arranged on the bottom inside of the tank and has the supply-pipe L attached to the valve-casing to discharge through the inlet-port B. The handle is detached from the outlet-stem and a gear $m$ is substituted therefor, said gear being fastened on the outlet-stem to turn the same. With this gear meshes the toothed edge of a sector M, which is pivoted on a fixed bolt $m'$, and to the apex or angle of the sector is attached the stem N of the float or air-ball $n$. This float is not weighted on its lower inner side; but it is made of light sheet metal, rubber, or other appropriate material. As a substitute for the weight usually supplied to air-balls to insure prompt descent thereof when the water-line is lowered we provide the cup O, which is arranged below the float and is attached to the same by a stem $o$. In the bottom of the cup or receptacle is a port $o'$ for the purpose of admitting water to the cup. When the tank is in running order, the cup always remains below the water-line and is filled with water.

By providing the small hole in the bottom of the cup the cup automatically fills itself when the tank is first installed in position for operation. If the dwelling should be unoccupied and it is desirable to shut off the plumbing, the water drains from the cup through the hole in the bottom thereof and no water is left in the tank to freeze therein.

It is thought that the operation and advantages of our invention will be readily understood by those skilled in the art from the foregoing description, taken in connection with the drawings.

We are aware that changes in the form and proportion of parts and in the details of construction may be made without departing from the spirit or sacrificing the advantages of our invention, and we therefore hold ourselves at liberty to make such alterations as fairly fall within the scope of our invention.

Having thus fully described our invention, what we claim as new, and desire to secure by Letters Patent, is—

1. The combination with a shell or casing, of an axially-turning, hollow, outlet-stem fitted tightly in said shell and provided at its inner part with lateral ports which open into the bore of longitudinal passage in said shell, a movable guide situated at one side of said stem, within the shell, and an endless band or ring-packing stretched around said guide and the stem and fitted tightly to the stem to expose or cover the lateral ports in said stem, as set forth.

2. In combination, a hollow outlet-stem provided with lateral egress-ports, an antifriction-roller forming a guide which is situated at one side of said stem, and a movable band or packing fitted around said roller and the stem, as set forth.

3. In combination a hollow outlet-stem having a lateral egress-port, a guide-roller and an endless packing reinforced by external metallic bands and stretched around said guide-roller and the outlet-stem to expose or close the ports in the latter, as and for the purposes described.

4. The combination with a shell having a gland, a guide-roller within the shell, and an endless ring or band fitted to the guide-roller, of a hollow outlet-stem extending through said gland and having its inner perforated end partially encompassed by said endless band or ring, a packing around the stem and within the gland, a spring to compress said packing, and means for varying the pressure of the spring, substantially as and for the purposes described.

5. In combination, a shell or casing provided with a stuffing-box, a hollow outlet-stem stepped in said shell and having an egress-port, a removable top or cap for said shell, a guide-roller journaled in the shell independently of the top or cap plate thereof, and a band or ring-packing fitted around the guide-roller and the outlet-stem, as and for the purposes described.

6. In combination, a shell or casing, a hollow outlet-stem stepped within said shell, a guide-roller situated at one side of said stem, an endless band or ring-packing, and means for moving said band or packing, as set forth.

In testimony whereof we affix our signatures in presence of two witnesses.

JOHN F. COTTER.
JOSEPH TAGER.

Witnesses:
 VAN F. BOOR,
 F. W. KIENZLER.